United States Patent [19]

Kuryla et al.

[11] 4,192,647

[45] Mar. 11, 1980

[54] PRINT PASTE FORMULATIONS WITH HYDROXYALKYL CARBOXYALKYL CELLULOSE

[75] Inventors: William C. Kuryla, Saint Albans; Russell H. Raines, Nitro, both of W. Va.

[73] Assignee: Union Carbide Corporation, New York, N.Y.

[21] Appl. No.: 809,896

[22] Filed: Jun. 24, 1977

[51] Int. Cl.² .............................................. D06P 1/48
[52] U.S. Cl. .............................................. 8/62; 8/91; 106/193 D
[58] Field of Search ................. 8/91, 62; 106/193 D

[56] References Cited

U.S. PATENT DOCUMENTS

| | | | |
|---|---|---|---|
| 2,361,454 | 10/1944 | Cassel | 8/62 |
| 4,010,038 | 3/1977 | Iwasaki et al. | 106/193 D |

OTHER PUBLICATIONS

Chemical Abstracts, vol. 84, 1976, pp. 99, 100, 519 & 1371cs, and vol. 73, 1970, p. 74.

*Primary Examiner*—Donald Levy
*Attorney, Agent, or Firm*—Stanley Ktorides

[57] ABSTRACT

A print paste formulation, useful in the printing of carpets and fabrics, comprising hydroalkyl carboxyalkyl cellulose as the thickening agent, a dye, and water as the carrier.

7 Claims, No Drawings

PRINT PASTE FORMULATIONS WITH HYDROXYALKYL CARBOXYALKYL CELLULOSE

BACKGROUND OF THE INVENTION

In the printing of natural or synthetic textile fabrics, the use of flat-bed and rotary screen printing has become quite prevalent. In these operations a screen defining the pattern to be printed is positioned over the textile (e.g. in the form of a fabric or carpet) and the dye paste is forced through the screen by a squeegee drawn across the screen. This procedure can be repeated with a sequence of screens and different colored print pastes to achieve the desired colored pattern on the substrate.

Screen printing procedures have imposed stringent performance requirements on the print paste formulations employed. These must be readily applicable to the fabric through the design screen to produce a clearly defined pattern and the resultant printing or design must be highly reproducible, preferably with a minimum of shut downs for maintenance of screens and squeegees.

The major constituents of the print pastes are a dye and water. Additionally, a chemical thickener is usually present to impart the desired viscosity to the print paste. Hydroxyalkylated cellulose, such as hydroxyethyl cellulose, is a commonly employed thickening agent in many applications, particularly in water-based compositions since the hydroxyalkyl group is hydrophilic. However, a problem has occurred in attempts to use hydroxyalkyl cellulose as a thickener in certain print paste formulations in that it has caused the formation of a water-insoluble sticky residue in the print paste. The formation of the residue resulted in clogging of the screens necessitating interruption of production operations in order to remove the residue from screens and squeegees.

The above described residue problem has been noted with a number of print pastes, but it is particularly severe when the print paste contains one of the so called "metallized" or "premetallized" dyes and especially when dyeing is carried out under conditions of low pH (i.e. on the order of about 2.0-5.0). As used herein the terms "metallized dye" or "premetallized dye" includes the acid metallized dyes and the neutral metallized dyes. In the carpet dyeing industry metallized dyes are frequently used and dyeing is frequently carried out under low pH conditions in order to obtain a high level of colorfastness, thus the residue formation problem is frequently encountered.

A further problem encountered with hydroxyalkylated cellulose is that it is sometimes difficult to dissolve in print pastes containing metallized dyes, requiring surfactants to be used to achieve a homogeneous composition.

SUMMARY OF THE INVENTION

We have now discovered that when hydroxyalkyl carboxyalkyl cellulose such as hydroxyethyl carboxymethyl cellulose is employed as a thickening agent in a print paste the aforementioned residue problem does not occur, even when the print paste contains a metallized dye and when dyeing is carried out under conditions of low pH. This result was totally unexpected and nonobvious in view of the residue formation problem encountered with hydroxyalkyl cellulose. Further, the hydroxyalkyl carboxyalkyl cellulose is compatible with the print paste without the use of surfactants.

DESCRIPTION OF THE INVENTION

In accordance with our invention, improved print paste formulations are produced by employing as a thickener therein hydroxyalkyl carboxyalkyl cellulose having from 2 to 5 carbon atoms in the hydroxyalkyl unit and from 1 to 5 carbon atoms in the carboxyalkyl unit. Illustratively, the hydroxyalkyl carboxyalkyl cellulose can be hydroxyethyl carboxymethyl cellulose, hydroxypropyl carboxymethyl cellulose, hydroxypropyl carboxyethyl cellulose, and the like.

Hydroxyalkyl carboxyalkyl cellulose, which is employed as the thickener in the improved print paste formulations of this invention, is well known to those skilled in the art. Those skilled in the art are aware that the hydroxyalkyl substituent thereof is usually substituted onto the cellulose backbone by reacting an appropriate 1,2-alkylene oxide, such as ethylene oxide, with the hydroxyl groups of the cellulose chain. The ring-opening addition of the 1,2-alkylene oxide results in the substitution of the corresponding hydroxyalkyl group onto the cellulose backbone (e.g. the hydroxyalkyl group is hydroxyethyl where the 1,2-alkylene oxide is ethylene oxide, hydroxypropyl where the 1,2-alkylene oxide is propylene oxide, etc.).

It will be recognized, however, that in some instances the reaction of the 1,2-alkylene oxide with the hydroxyl groups of the cellulose results in a chaining out reaction that produces substituents of the form

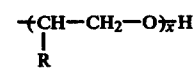

wherein R is hydrogen or alkyl and wherein $x > 1$. It is understood that such substituents, while they may not strictly be termed hydroxyalkyl groups (being more properly called hydroxyl-terminated polyoxyalkylene groups), can be present in hydroxyalkyl carboxyalkyl cellulose and, as used herein, the term "hydroxyalkyl" includes substituents having the above formula. Where such groups are present, each alkylene moiety thereof

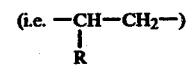

has from 2 to 5 carbon atoms.

The "molar substitution" (also referred to hereinafter as "M.S.") of the hydroxyalkyl carboxyalkyl cellulose is defined as the average number of oxyalkylene groups, i.e.

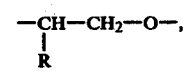

per anhydroglucose unit which are present in the hydroxyalkyl groups. The "degree of substitution" (also referred to hereinafter as "D.S.") is defined as the average number of carboxyalkyl groups per anhydroglucose unit. Suitable methods for determining M.S. and D.S. values are described in ASTM D 2364 and ASTM D 1439, respectively.

The hydroxyalkyl carboxyalkyl cellulose which is useful in the improved print paste formulations of this invention has a D.S. value which is sufficient to prevent residue formation therein. Additionally, the sum of M.S. and D.S. values is such that the hydroxyalkyl carboxyalkyl cellulose is water soluble and provides the desired viscosity in the formulation. Those skilled in the art will recognize that an increase in either the M.S. or D.S. value increases water solubility, thus, as the M.S. value is increased a lower corresponding D.S. value is needed to impart water solubility. At the same time, the hydroxyalkyl moiety tends to impart greater thickening efficiency than does the carboxyalkyl moiety. Thus, the minimum allowable M.S. value is at least partially dictated by the desired viscosity in the application at hand. From a standpoint of inhibiting residue formation, providing water solubility, and providing a print paste formulation with a viscosity useful in commercial printing operations, it is usually desired to employ hydroxyalkyl carboxyalkyl cellulose wherein the M.S. value is at least 0.8 and the D.S. value is at least 0.3.

The hydroxyalkyl carboxyalkyl cellulose is present in the improved print paste formulation of this invention in an amount sufficient to impart the desired viscosity to the print paste formulation, which will vary somewhat depending on the substrate to be printed, the mesh size of the printing screens, the M.S. and D.S. values, etc. In commercial print paste formulations we generally employ the hydroxyalkyl carboxyalkyl cellulose at a concentration of from about 0.05 to 25 weight percent, preferably from about 0.1 to 5 weight percent, based on the total weight of the print paste formulation.

In addition to the hydroxyalkyl carboxyalkyl cellulose, the improved print paste formulations of this invention contain a dye, water, and any other additives which are known in the art to be useful constituents of print paste formulations, such as dye fixatives, antistats, bactericides, fungicides, and the like. The relative proportions in which these constituents are used in print paste formulations are well known in the art.

In accordance with the teachings of our invention the hydroxyalkyl carboxyalkyl cellulose is suitably employed as the thickener in a print paste containing any of the known dyes such as, for example, those listed in the Technical Manual of the American Association of Textile Chemists and Colorists. However, the residue formation problem previously described has been most notably occurrent in print pastes containing metallized dyes, particularly when dyeing is carried out under conditions of low pH, that is, pH values below about 5, hence the improved print paste formulations of this invention containing metallized dyes generally display the greatest improvement over comparable prior art print pastes which use conventional thickeners. The term "metallized dyes", as used herein incoudes the acid metallized dyes and the neutral metallized dyes.

Many metallized dyes are known and commercially available and an extensive enumeration thereof is not necessary for one skilled in the art to clearly understand and reproduce the herein claimed invention. Nevertheless, one can mention, as being merely illustrative of the metallized dyes useful in the improved print paste formulations of this invention, Acid Orange 60 (C.I. 18732), Acid Red 186 (C.I. 18810), Acid Yellow 54 (C.I. 19010), Acid Yellow 99 (C.I. 13900), Acid Red 182, Acid Blue 165, Acid Brown 29, Acid Orange 64, Acid Black 52 (C.I. 15711), Acid Blue 158 (C.I. 14880), Acid Green 12 (C.I. 13425), Acid Blue 158 (C.I. 14880), Acid Violet 56 (C.I. 16055), Acid Brown 19, Acid Orange 86, Acid Yellow 151, Acid Red 213, Acid Yellow 114, Acid Brown 45, Acid Black 60, and the like.

The above listing is not meant to be all-inclusive, but is merely illustrative of some of the most frequently used metallized dyes. A more complete listing is found in the Technical Manual of the American Association of Textile Chemists and Colorists.

Those skilled in the art will know the concentrations at which the dyes are suitably employed in print paste formulations without further elaboration herein. The amount varies dependent on the particular dye chosen and the desires of the practitioner. Typically, the dye is used at a concentration of from about 0.01 to about 5 weight percent, based on the total weight of the print paste formulation.

As previously mentioned, any other additives conventionally employed in print paste formulations of the prior art can be present in the improved print paste formulations of this invention in the usual known concentrations. Typically, the total concentration of these additives in the print paste formulations is quite small, that is, not greater than about 10 weight percent.

In addition to the hydroxyalkyl carboxyalkyl cellulose, dye, and other additives if present, the balance of the improved print paste formulations of this invention is water.

The improved print paste formulations of this invention are produced by mixing the components specified above until a uniform mixture is obtained. It is important, however, that the hydroxyalkyl carboxyalkyl cellulose be thoroughly mixed with at least a portion of the water before the dye is added thereto in order to achieve a homogeneous mixture. The premixture containing the hydroxyalkyl carboxyalkyl cellulose and water is referred to in the examples which follow as a "reduction mix". The dye can be mixed directly with the reduction mix and then an additional portion of water added, if desired, to adjust the final composition, or the dye can be mixed with a portion of the water prior to mixing it with the reduction mix.

The improved print paste formulations of this invention have Brookfield viscosities at 25° C. of from about 100 cps. to about 20,000 cps. The particular viscosity required will depend on the structure of the substrate that is to be dyed and the design to be imparted to it. It is well within the ability of the skilled worker to vary the concentrations of the components within the limits noted above to achieve the desired viscosity in the print paste formulation.

The improved print paste formulations of this invention can be used to dye shag carpets having a short or full pile, plush carpets, level loop carpets or conventional fabrics. The methods employed are well known to those skilled in the art as are the printing techniques and apparatus used. The examples which follow further illustrate the invention and are not intended to limit the invention in any way. The hydroxyethyl carboxymethyl cellulose used in each of the examples had a D.S. of 0.5357 and an M.S. of 0.9816.

EXAMPLE 1

To a 16-ounce, wide mouth bottle equipped with an electric stirrer there were added 15 grams of benzyl alcohol and 375 grans of water. The mixture was stirred at moderate speed with a Lightnin TM mixer and there were slowly added 10 grams of hydroxyethyl carboxymethyl cellulose. The mixture was then stirred for 2-3 hours to insure that all the hydroxyethyl carboxymethyl cellulose was in solution. The resulting solution, which was used as the reduction mix of this example, had a Brookfield viscosity at 96° F. (No. 4 spindle at 60 rpm) of 3150 cps.

There were then added to a different bottle equipped with an electric stirrer, 125 grams of the reduction mix and 75 grams of a dye solution. The dye solution had been produced by mixing 2 parts by weight of a neutral metallized dye, Acid Yellow 151 (C.I. 13906), and 73 parts by weight of water and boiling to insure solution, and was added to the reduction mixture at a temperature near boiling. The mixture of the reduction mix and dye solution were stirred to a uniform consistency to produce a print paste. To the print paste there were then added 6 grams of formic acid as a dye fixative. The resultant print paste formulation had a Brookfield viscosity at 77° F. (No. 4 spindle at 60 rpm) of 1050 cps. and a pH of 2.5–2.6. To determine whether any residue would precipitate out of the print paste formulation, it was centrifuged for one hour at 16,000 rpm. Subsequent examination revealed the formation of no residue.

The benzyl alcohol used in this example and the following examples is widely employed in print paste formulations in the carpet printing industry because it is known to render the carpet pile more receptive to the dye. However, it is not necessary to have the benzyl alcohol present in the print paste formulations of our invention to achieve the benefits thereof.

EXAMPLE 2

Using a procedure similar to that of Example 1, a reduction mix was prepared as a mixture of the components indicated in the table below. The reduction mix was used to prepare a print paste formulation as a mixture of the components indicated in the table and 6.0 grams of formic acid were added to the print paste as a dye fixative. The dye used was a neutral metallized dye, Acid Orange 60 (C.I. 18732).

| Reduction Mix | Grams |
| --- | --- |
| Benzyl Alcohol | 8.0 |
| Hydroxyethyl carboxymethyl Cellulose | 10.0 |
| Water | 382.0 |
| Print Paste | Grams |
| Reduction Mix | 125.0 |
| Dye Solution* | 69.0 |

*2 p.b.w. dye/67 p.b.w. water

The Brookfield viscosity of the reduction mix at 78° F. (No. 4 spindle at 60 rpm) was about 4810 cps. The Brookfield viscosity of the print paste formulation at 76° F. (No. 4 spindle at 60 rpm) was 1410 cps. The print paste had a smooth, uniform appearance and no residue was apparent after one hour of centrifuging at 16,000 rpm.

EXAMPLE 3

Using a procedure similar to that of Example 1, a reduction mix was prepared as a mixture of the components indicated in the table below. The reduction mix was used to prepare a print paste formulation as a mixture of the components indicated in the table and 6.0 grams of formic acid were added to the print paste formulation as a dye fixative. The dye used was a neutral metallized dye, Acid Red 182.

| Reduction Mix | Grams |
| --- | --- |
| Benzyl Alcohol | 8.0 |
| Hydroxyethyl Carboxymethyl Cellulose | 10.0 |
| Water | 382.0 |
| Print Paste | Grams |
| Reduction Mix | 125.0 |
| Dye Solution* | 69.0 |
| Formic Acid | 6.0 |

*2 p.b.w. dye/67 p.b.w. water

The reduction mix had a Brookfield viscosity at 78° F. (No. 4 spindle at 60 rpm) of 4810 cps. The print paste had a Brookfield viscosity at 81° F. (No. 4 spindle at 60 rpm) of 1640 cps. The print paste had a smooth, uniform appearance and no residue was apparent after one hour of centrifuging at 16,000 rpm.

COMPARATIVE EXAMPLES

Using a procedure similar to that of Example 1, two reduction mixes were prepared as indicated in the table below, using hydroxyethyl cellulose as the thickening agent. In one reduction mix, the hydroxyethyl cellulose used had a Brookfield viscosity* at 25° C. (No. 3 spindle at 30 rpm) of approximately 2,000 cps. (Cellosize ® QP 2,000, Union Carbide Corporation). In the other reduction mix, the hydroxyethyl cellulose used had a Brookfield viscosity* at 25° C. (No. 4 spindle at 60 rpm) of approximately 4,400 cps. (Cellosize ® QP 4,400, Union Carbide Corporation). Both reduction mixes were then employed to produce print paste as shown in the table. Each of the reduction mixes was used to prepare print pastes using the Acid Yellow 151 and Acid Red 182 dyes which were used in Examples 1 and 3, respectively. The 6 drops of sodium hydroxide were added to the reduction mixes in these examples in order to speed thickening.

*Measured as a 2 wt. % aqueous solution

In each instance, the hydroxyethyl cellulose did not remain in solution in the print paste, but rather, separated from the dye solution. It was found that a homogeneous solution could be obtained by adding to the print paste formulation 0.5 gram of polyethylene glycol having a molecular weight in the range of 3,000–3,700. However, upon centrifuging at 16,000 rpm for one hour the print paste containing the Acid Red 182 in conjunction with hydroxyethyl cellulose and polyethylene glycol became contaminated with a sticky residue. The residue observed had the same appearance as the residue which has been observed in the clog printing screens when print paste formulations containing conventional thickeners and metallized dyes are employed. No residue appeared upon centrifuging the print paste formulations containing the Acid Yellow 151 and hydroxyethyl cellulose in conjunction with polyethylene glycol. However, when hydroxyethyl cellulose in conjunction with polyethylene glycol has been used as a thickener in commercial screen printing operations carried out at low pH (i.e. 2.6–2.8) residue formation and screen clogging has been observed with Acid Yellow 151.

This comparative example illustrates the difficulty in producing stable, non-precipitating print paste formulations using hydroxyethyl cellulose as a thickener in conjunction with metallized dyes. In view of the difficulty in producing stable, non-precipitating print paste formulations using hydroxyethyl cellulose in conjunction with metallized dyes, it was a totally unexpected and nonobvious finding that stable, non-precipitating print paste formulations could be obtained using hydroxyalkyl carboxyalkyl cellulose in conjunction with metallized dyes.

| Reduction Mix | Grams |
| --- | --- |
| Benzyl Alcohol | 8.0 |
| Hydroxyethyl Cellulose | 10.0 |
| Formic Acid | 5 drops |
| Sodium Hydroxide | 6 drops |
| Water | 400 |

| Print Paste | Grams |
| --- | --- |
| Reduction Mix | 125.0 |
| Dye Solution* | 69.0 |
| Formic Acid | 6.0 |

*2 p.b.w. dye/67 p.b.w. water

Another comparative example was performed in the following manner. To a 16 ounce wide mouth bottle there were charged 391.6 grams of water. While the water was stirred slowly, there were added 8.4 grams of hydroxyethyl cellulose having an approximate viscosity of 4,750 cps. at 25° C., measured as a 1 wt.% solution in water with a No. 4 spindle at 30 rpm (Cellosize® WP 100 MH, Union Carbide Corporation). The mixture was stirred for 3 hours during which water was added to make up for evaporative losses. The resultant reduction mix had a viscosity of 48,200 cps. at 79° C., measured with a No. 6 spindle at 20 rpm.

To 80 grams of the reduction mix there was added 116 grams of hot water containing 8 grams of Acid Yellow 151. A homogeneous solution could not be obtained.

To a different 80 gram portion of the reduction mix there were added 1.8 grams of polyethylene glycol having a molecular weight in the range 3,000–3,700, followed by addition of 114.2 grams of hot water containing 8.0 grams of Acid Yellow 151. A homogeneous print paste solution was thus achieved and 8.0 grams of 90% formic acid were then added as a dye fixative. The print paste formulation had a viscosity of 3,500 cps. at 77° F., measured with a No. 6 spindle at 20 rpm.

Upon centrifuging a 25-gram sample of the print paste formulation at 16,000 rpm for one hour, a sticky, water-insoluble residue appered in the bottom of the centrifuge tube. This residue had the same appearance as the residue which has been observed to clog printing screens in commercial printing operations.

What is claimed is:

1. In a print paste formulation containing water and a dye chosen from the group consisting of acid metallized and neutral metallized dyes, the improvement which comprising having hydroxyalkyl carboxyalkyl cellulose present therein as a thickener.

2. An improved print paste formulation as claimed in claim 1, wherein said hydroxyalkyl carboxyalkyl cellulose has from 2 to 5 carbon atoms in the hydroxyalkyl unit and from 1 to 5 carbon atoms in the carboxyalkyl unit.

3. An improved print paste formulation as claimed in claim 1 wherein said hydroxyalkyl carboxyalkyl cellulose is present in said print paste formulation at a concentration of from 0.05 to 25 weight percent thereof.

4. An improved print paste formulation as claimed in claim 1, wherein said hydroxyalkyl carboxyalkyl cellulose is present at a concentration of from 0.1 to 5 weight percent thereof.

5. An improved print paste formulation as claimed in claim 1, wherein said hydroxyalkyl carboxyalkyl cellulose has an M.S. value of at least 0.8 and a D.S. value of at least 0.3.

6. An improved print paste formulation as claimed in claim 5, having a pH value below 5.

7. An improved print paste formulation as claimed in claim 1, wherein said hydroxyalkyl carboxyalkyl cellulose is hydroxyethyl carboxymethyl cellulose.

* * * * *